United States Patent
Caulfield

(10) Patent No.: US 10,846,092 B2
(45) Date of Patent: Nov. 24, 2020

(54) EXECUTION OF MICRO-OPERATIONS

(71) Applicant: ARM LIMITED, Cambridge (GB)

(72) Inventor: Ian Michael Caulfield, Cambridge (GB)

(73) Assignee: ARM Limited, Cambridge (GB)

( * ) Notice: Subject to any disclaimer, the term of this patent is extended or adjusted under 35 U.S.C. 154(b) by 825 days.

(21) Appl. No.: 15/152,781

(22) Filed: May 12, 2016

(65) Prior Publication Data
US 2017/0017490 A1    Jan. 19, 2017

(30) Foreign Application Priority Data

Jul. 16, 2015    (GB) .................................. 1512455.5

(51) Int. Cl.
*G06F 9/38*    (2018.01)
(52) U.S. Cl.
CPC .......... *G06F 9/3802* (2013.01); *G06F 9/3836* (2013.01)
(58) Field of Classification Search
None
See application file for complete search history.

(56) References Cited

U.S. PATENT DOCUMENTS

| | | | |
|---|---|---|---|
| 6,581,154 B1 | 6/2003 | Zaidi | |
| 9,817,466 B2 * | 11/2017 | Sideris | .................. G06F 1/3243 |
| 2007/0038844 A1 | 2/2007 | Valentine et al. | |
| 2012/0066481 A1 | 3/2012 | Chaussade et al. | |
| 2014/0208073 A1 | 7/2014 | Blasco-Allue et al. | |
| 2014/0215189 A1 | 7/2014 | Airaud et al. | |

OTHER PUBLICATIONS

Combined Search and Examination Report for GB1512455.5 dated Jan. 20, 2016, 7 pages.

* cited by examiner

*Primary Examiner* — Geirge Giroux
(74) *Attorney, Agent, or Firm* — Nixon & Vanderhye P.C.

(57) ABSTRACT

Processing circuitry includes execute circuitry for executing micro-operations in response to instructions fetched from a data store. Control circuitry is provided to determine, based on availability of at least one processing resource, how many micro-operations are to be executed by the execute circuitry in response to a given set of one or more instructions fetched from the data store.

17 Claims, 7 Drawing Sheets

EXECUTION OF MICRO-OPERATIONS

BACKGROUND

This application claims priority to GB Patent Application No. 1512455.5 filed 16 Jul. 2015, the entire content of which is hereby incorporated by reference.

TECHNICAL FIELD

The present technique relates to the field of data processing. More particularly, it relates to the execution of micro-operations.

TECHNICAL BACKGROUND

A processor may split some types of instructions into multiple micro-operations to be executed.

SUMMARY

At least some examples provide processing circuitry comprising:
execute circuitry to execute micro-operations in response to instructions fetched from a data store; and
control circuitry to determine, in dependence on availability of at least one processing resource, how many micro-operations are to be executed by the execute circuitry in response to a given set of one or more instructions fetched from the data store.

At least some examples provide an electronic apparatus comprising the processing circuitry described above.

At least some examples provide means for processing, comprising:
means for executing micro-operations in response to instructions fetched from a data store; and
means for determining, in dependence on availability of at least one processing resource, how many micro-operations are to be executed by the means for executing in response to a given set of one or more instructions fetched from the data store.

At least some examples provide a method comprising:
fetching a set of one or more instructions from a data store;
in dependence on availability of at least one processing resource, determining how many micro-operations are to be executed in response to said set of one or more instructions; and
executing the micro-operations using execute circuitry.

The above, and other objects, features and advantages will be apparent from the following detailed description of illustrative embodiments which is to be read in connection with the accompanying drawings.

DESCRIPTION OF EXAMPLES

Some specific examples will be discussed below.

Some processing circuitry may be able to split fetched instructions into a number of smaller operations, typically known as micro-operations (also known as micro-ops, μops, or uops). Each uop can be independently scheduled and executed by the processing circuitry. The criteria for how instructions are split into uops is typically fixed, and hard-wired into the processing circuit during manufacture. For example, some instructions may require operations to be performed by different execute units (for example integer and floating-point operations may be handled by separate issue logic or execute units) and so such instructions may be mapped to separate uops, one for each execute unit. Some instructions may be split into uops for resource sizing or bandwidth reasons (for example, multiple-register stores may need to be split into multiple uops in order to fit the available number of register file read ports). In known systems the way in which a particular instruction is divided into uops is fixed and so a given program instruction will always lead to the same combination of uops being executed.

However, the inventor realised that a fixed splitting of a given instruction into uops may not always give the best performance. For example, sometimes a combined uop that performs several steps of processing may be more efficient than separate uops for each step, because this can reduce the time when an issue port, execute unit, issue queue or other structure within the processor is occupied in processing uops for a given instruction, allowing other uops to be processed faster. However, on other occasions, the combined uop may reduce performance because it is more likely to be stalled if a processing resource required for the compound uop is not available, while in contrast if the instruction was split into multiple uops then even if a processing resource required for a later uop is not available, earlier uops can still be executed. Therefore, whether it is more efficient to map a given set of one or more instructions into more or fewer uops may depend on the availability of at least one resource.

Therefore, processing circuitry may be provided with control circuitry for determining, in dependence on availability of at least one processing resource, how many uops are to be executed by execute circuitry in response to a given set of one or more instructions fetched from a data store. By dynamically determining the number of uops to be executed for a given instruction or set of instructions, based on whether at least one resource is available, rather than assuming a fixed default mapping of uops based on the instruction type, overall performance can be improved.

Figure 1:
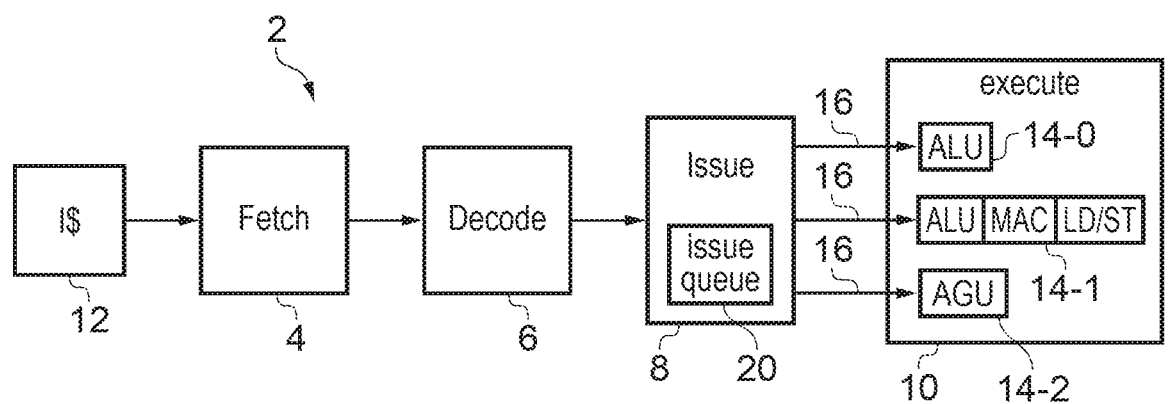
FIG. 1 schematically illustrates an example of a processing pipeline for performing data processing in response to instructions.

FIG. 1 schematically illustrates an example of a processing pipeline 2 for performing data processing in response to instructions. The pipeline 2 includes a number of pipeline stages including a fetch stage 4, a decode stage 6, an issue stage 8 and an execute stage 10. It will be appreciated that this is just a simplified example of a possible pipeline architecture and that other examples may have different stages. For example a register rename stage could be provided for performing register renaming to map architectural register specifiers specified by instructions to physical register specifiers identifying registers provided in hardware in the processor. Also, a dispatch stage could be provided between the decode and issue stages 6, 8 which may decouple the decode stage from an issue queue 20 so that decoded instructions can leave the decode stage 6 before there is space in the issue queue 20. Instructions move from stage to stage and each stage processes an instruction in parallel with processing of other instructions at other stages.

The fetch stage 4 fetches program instructions from an instruction cache 12. The fetched instructions are provided to the decode stage 6 which decodes the instructions to generate micro-operations. The decode stage 6 may interpret the opcode of the instructions and any other information provided with the instructions in order to generate decoded uops which may provide information for controlling the execute stage 10 to carry out the appropriate processing operations. Some instructions may be mapped to a single uop by the decode stage 6, while other instructions may be split into multiple uops. The decoded uops are provided to the issue stage 8 where they are placed in an issue queue while waiting for operands to become available. In this embodiment, the issue stage 8 supports out-of-order issue so that uops can be issued for execution by the execute stage 10 in a different order to the program order of the corresponding instructions fetched from the cache 12 by the fetch stage 4. Hence, while one uop is stalled because it is waiting for operands to become available, a later uop corresponding to a later instruction in the program order can be executed first. Other embodiments may only support in-order issue so that when one uop is stalled, later uops in the program order are also stalled even if their operands are available.

As shown in FIG. 1, the execute stage may include a number of execute units 14 for carrying out different types of processing operation. For example, in the example of FIG. 1 the execute units include an arithmetic/logic unit (ALU) 14-0 for carrying out arithmetic operation (such as add, subtract, multiply, divide or shift operations) or logical operations (such as AND, OR, XOR, NAND, etc.), an address generation unit (AGU) 14-2 for calculating addresses of memory locations to be accessed, and a compound execute unit 14-1 which comprises an ALU for performing the same ALU operations as the ALU 14-0, a load/store unit (LD/ST) for carrying out load or store operations to a data cache or memory and a multiply accumulate unit (MAC) for carrying out multiple accumulate operations. It will be appreciated that this is just an example of possible execute units and many other kinds could be provided. The issue stage 8 has a number of issue ports 16 for issuing uops to the respective execute units 14 for execution.

Figure 2:
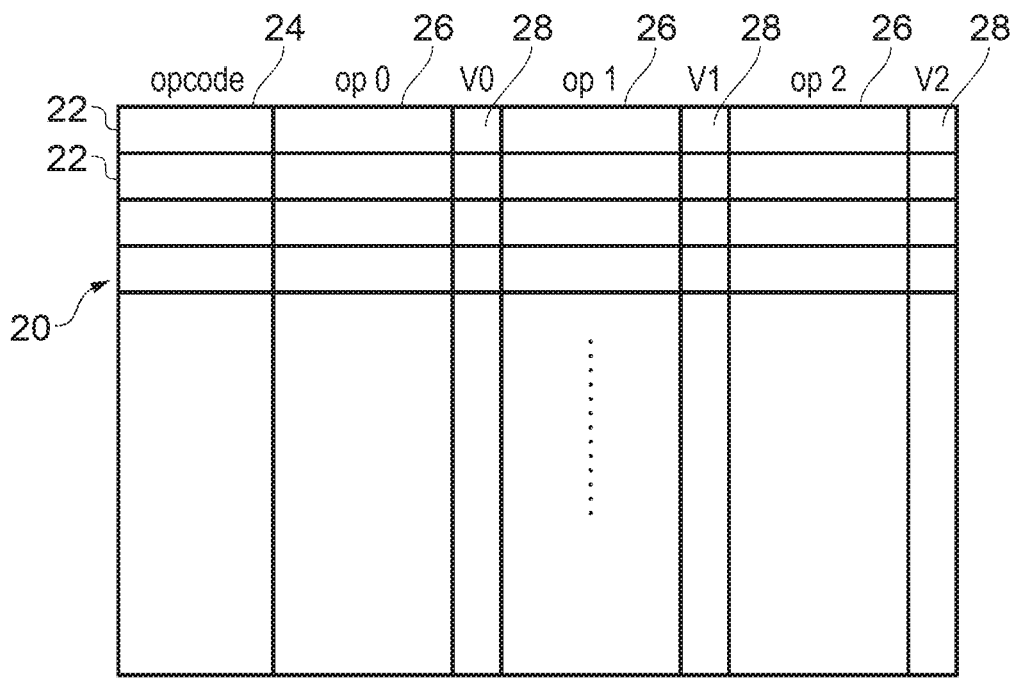
FIG. 2 shows an example of an issue queue for queueing micro operations awaiting issue for execution.

FIG. 2 shows an example of an issue queue 20 or reservation station used by the issue stage 8 to track uops to be issued for execution. The issue queue 20 includes a number of entries 22 with each entry corresponding to a given uop to be executed. Each entry includes an opcode 24 identifying the type of processing operation to be performed in the execute stage 10 in response to the uop, and one or more operands 26 required for processing the corresponding uop. It will be appreciated that other information could also be stored in each entry, although not illustrated in FIG. 2 (e.g. an indication of a destination register for the instruction, condition code information, etc.). Each operand 26 may be represented by an immediate value directly indicating the operand value to be used, or by a register specifier indicating a register that stores the corresponding operand. Each operand 26 may be associated with a valid flag 28 indicating whether the corresponding operand is available yet. For example, when an earlier instruction which generates the operand value is complete, then the valid flag 28 for later instructions using that operand may be set. When all the required operands for a given uop are indicated as available, then the issue stage 8 can issue that uop for execution.

In known processors, the way in which a particular instruction is divided into uops is fixed and statically determined so that it is the same each time that instruction is encountered. For example a decode stage 6 may simply generate a predetermined set of one or more uops in response to a given instruction. However, as shown in the examples below, in the present technique a dynamic partitioning of program instructions into uops is supported so that there is flexibility to determine, depending on resource availability within the pipeline, how many uops are to be executed for a given instruction or set of instructions fetched from the instruction cache 12.

Figure 3A:
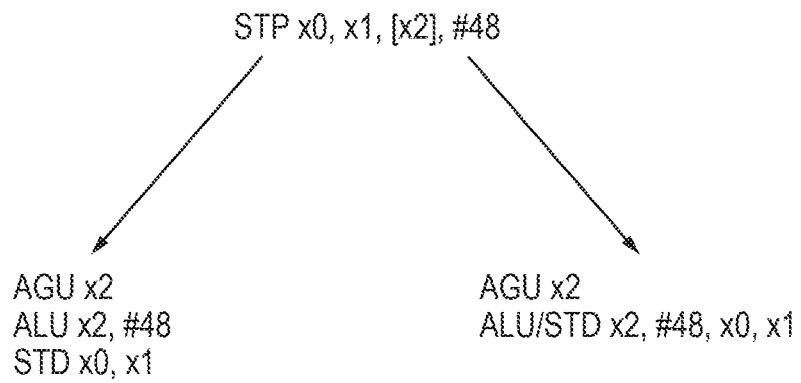
FIGS. 3A to 3C show a first example of dynamically selecting how many micro-operations to execute in response to a given instruction.

FIG. 3A shows an example of a double register store instruction STP using post-indexed addressing. The instruction specifies as operands two registers x0, x1 which store data values to be stored to a cache or memory, a third register x2 which stores a base address used to calculate the memory address for the store operations, and an immediate value #48 which is used as an offset to the base address. The post-indexed addressing mode means that the store operation is performed using an address calculated using register x2 without applying the offset of 48, but then the base register x2 is updated with the sum of the previous value of the data register and the immediate offset 48. Hence, the set of operations to be performed in response to the STP instruction would be as follows:

AGU 14-2 generates address using base address in register x2. In some cases the address generated by the AGU 14-2 may simply be the value stored in base register x2, while in other cases some further processing such as applying an offset could be performed by the AGU 14-2 to generate the store address.

The ALU 14-0 or execute unit 14-1 adds the immediate offset to the base address in register x2 and the result is written back to the base register x2.

The load/store unit within the execute unit 14-1 stores data values from registers x0, x1 to memory locations starting with the address generated by the AGU 14-2.

As shown in FIG. 3A, the execute stage 10 may be able to execute these operations using two or more different combinations of uops. As shown in the left hand part of FIG. 3A, the STP instruction could be mapped to 3 uops: a first uop (AGU x2) for generating the address at the AGU 14-2, a second uop (ALU x2, #48) for updating the base address using the immediate value and writing the result back to the base register x2, and a third uop (STD x0, x1) for carrying out the store operations using the generated address. In some systems two separate uops may be required for storing the pair of registers x0, x1 to memory (depending on the register read port bandwidth), but for conciseness only one store uop is shown in FIG. 3A.

As shown in the right hand part of FIG. 3A, an alternative is to merge the second and third uops into a single compound uop (ALU/STD x2, #48, x0, x1) which controls the compound execute unit 14-1 to perform both the store operation and the base address update operation. The address generation operation can still be performed as a standalone uop (AGU x2).

On some occasions, the merged uop approach shown in the right hand part of FIG. 3A might improve performance, because issuing one combined uop to the compound execute unit 14-1 saves issue bandwidth on the issue ports 16 compared to issuing two separate uops to the compound unit 14-1 or issuing one uop to the compound unit 14-1 and another to the standalone ALU 14-0, which can allow another uop to be issued using the spare bandwidth to improve performance. Also, the merged uop may allow a shorter residency time within the issue queue 20 or other structures for tracking the uops for a given instruction, freeing a slot for another uop which may then be able to be processed more quickly.

However, on other occasions this benefit may be outweighed by the performance cost when the merged uop is delayed because it has to wait for the availability of the store operands in registers x0, x1, which could cause stalling of other operations which use the result of the address write back operation in base register x2. In contrast, if split uops were issued as in the left hand part of FIG. 3A, then even if operands x0, x1 are not available yet, the address generation uop AGU x2 can be issued to the ALU 14-0 or the compound unit 14-1, so that any subsequent instructions using register x2 can then proceed, improving performance.

Therefore, a static allocation of uops for a given instruction does not always provide the best performance. Instead, the present technique proposes a hybrid solution where the decision on how to map a given instruction or group of instructions into uops is deferred until a later stage of the pipeline such as the issue stage 8, when the number of uops to be executed for that instruction can be selected depending on resource availability at the time of issue.

Figure 3B:
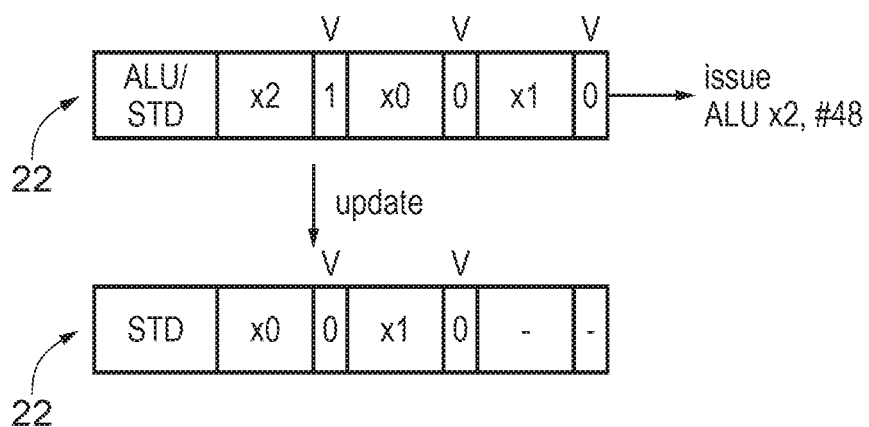
Figure 3C:
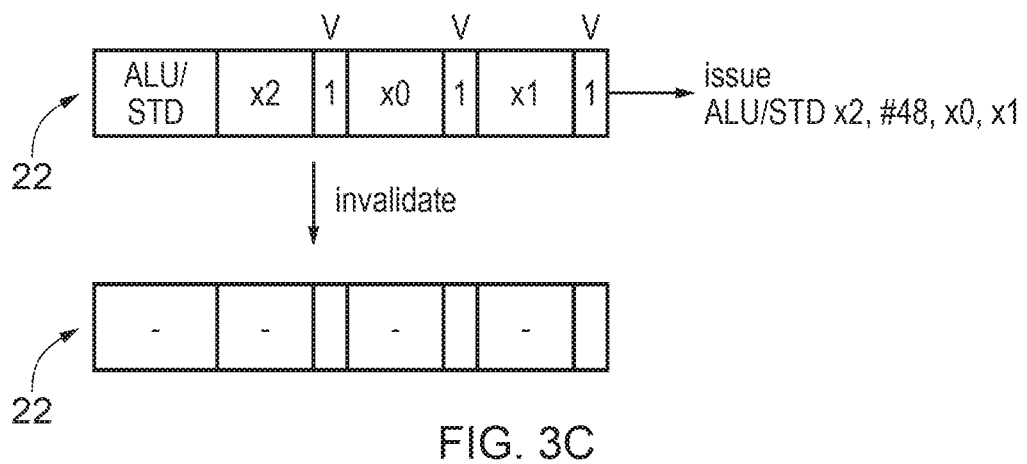

For example, as shown in FIG. 3B, initially the decode stage 6 may decode the STP instruction to generate a combined uop for the address writeback and store operations which can be allocated to a single entry of the issue queue 20 (for conciseness the standalone address generation uop AGU x2 is not shown in FIG. 3B because it would be the same for both approaches shown in FIG. 3A). Control circuitry associated with the issue stage 8 may determine whether each of the operands x2, x0, x1 required for the combined uop are available. As shown in FIG. 3C, if by the time operand x2 becomes available, operands x0 and x1 are also available, then the combined uop can be issued to compound execute unit 14-1 and the corresponding entry 22 of the issue queue 20 can then be invalidated or allocated to a different uop. By issuing a compound uop if possible, this requires only a single issue slot on one of the issue ports 16 and frees the corresponding entry 22 of the issue queue sooner so that throughput of uops can be increased.

However, as shown in FIG. 3B, if the operand x2 becomes available, but one or both of operands x0, x1 are not yet available, then the address update and store operations can be split into two separate uops. Hence, as shown in FIG. 3B, an ALU uop is issued to the execute stage 10 to update the base address in register x2, and meanwhile the corresponding entry 22 is modified so that it now specifies a store uop for storing the values in registers x0, x1 to memory. When the store operands x0, x1 later become available then a separate store uop can be issued to the execute stage 10.

In summary, while the combined uop is placed in the issue queue 20 initially, the issue stage 8 only needs to wait for availability of the address operand x2 before arbitrating for issue, and does not rely on availability of the store operands x0, x1. If selected for issue, control circuitry within the issue stage 8 can examine whether the store data x0, x1 is available, and if so, then the combined uop can be issued as shown in FIG. 3C. If the store data is not available, then a standalone address writeback uop can be issued as shown in FIG. 3B and the issue queue or reservation station entry 22 remains valid and awaits store data availability before issuing as a separate store uop. This scheme allows the performance benefit of reduced issue bandwidth and shortened issue queue occupancy in the case where the store data is available in time, but does not delay the address writeback calculation if the store data is not available. Also, regardless of whether one or two uops are issued for execution in the end, only one entry 22 of the issue queue is required, freeing space for another uop to use another entry.

Figure 4A:
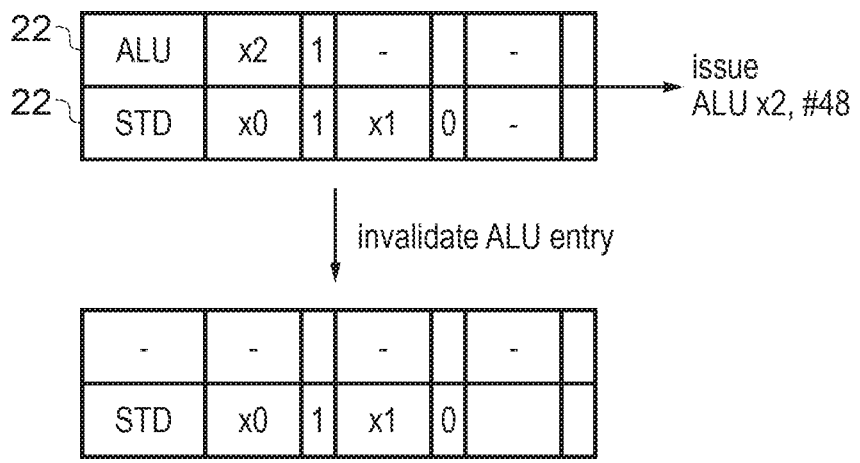
FIGS. 4A and 4B show an example of dynamically determining whether to merge two queued micro-operations based on operand availability.
Figure 4B:
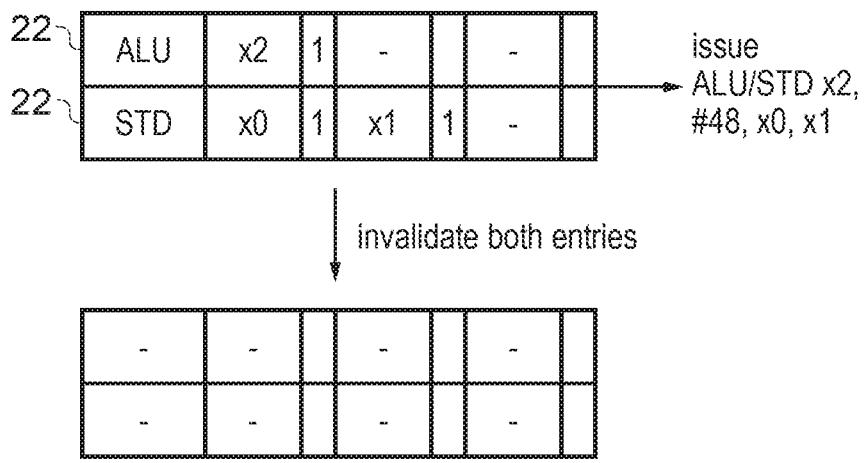

FIGS. 3B and 3C show an example where initially a compound uop is placed in the issue queue and then it is determined whether to split the uop into multiple uops depending on resource availability. However, it is also possible to start off with multiple uops in the issue queue and then to coalesce these into a combined uop if it is determined that the resources for executing the combined uop are available. FIGS. 4A and 4B show an example of this.

FIGS. 4A and 4B show an example of processing the same type of STP instruction as in the example above, with the same two options available for mapping the STP instructions into uops as shown in FIG. 3A. As shown in FIG. 4A, when the STP instruction is decoded, the decode stage 6 may generate two separate uops for the ALU operation to perform the address writeback to register x2 and the store operation respectively, and the two uops are placed in two separate entries 22 of the issue queue 20. As shown in FIG. 4A, if the operand x2 for the address writeback is available but the operands for the store are not yet available, then a standalone ALU uop can be issued, leaving the store uop valid. On the other hand, as shown in FIG. 4B, if the store operands x0, x1 are also available by the time the address operand x2 becomes available, then the two uops can be merged to save bandwidth on the issue ports 16 and potentially allow other uops to be issued more quickly. Hence, a compound uop ALU/STD is issued to the compound execute unit 14-1 and both issue queue entries 22 are invalidated.

Hence, regardless of whether one uop is split into multiple uops as shown in FIGS. 3B and 3C, or several uops are combined into one uop as in FIGS. 4A and 4B, the issue stage 8 may dynamically determine how many uops are to be executed in response to a given instruction, depending on operand availability.

FIGS. 3A to 4B shows an example where a single instruction is mapped to a variable number of uops dependent on resource availability. However, it is also possible to dynamically determine how many uops should be executed for a group of two or more program instructions fetched from memory.

Figure 5A:
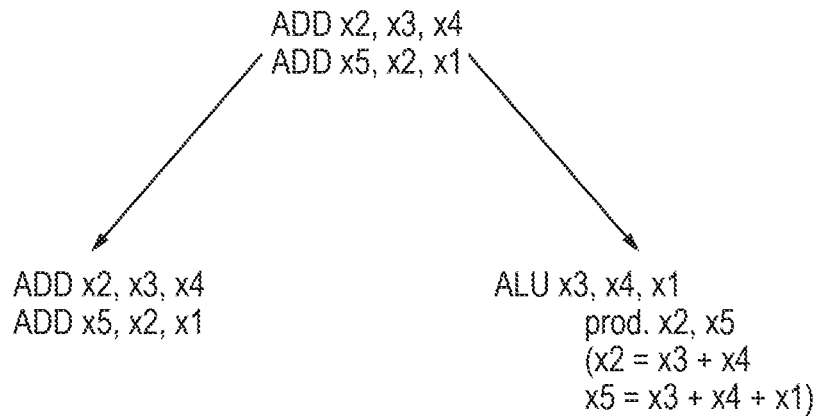
FIGS. 5A to 5C show another example of determining whether to merge micro-operations.
Figure 5B:
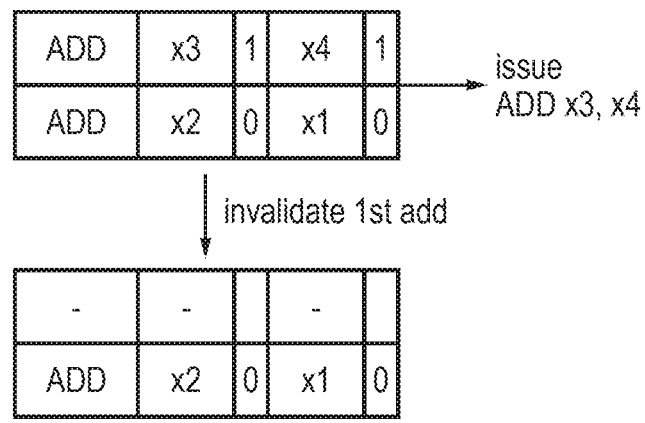
Figure 5C:
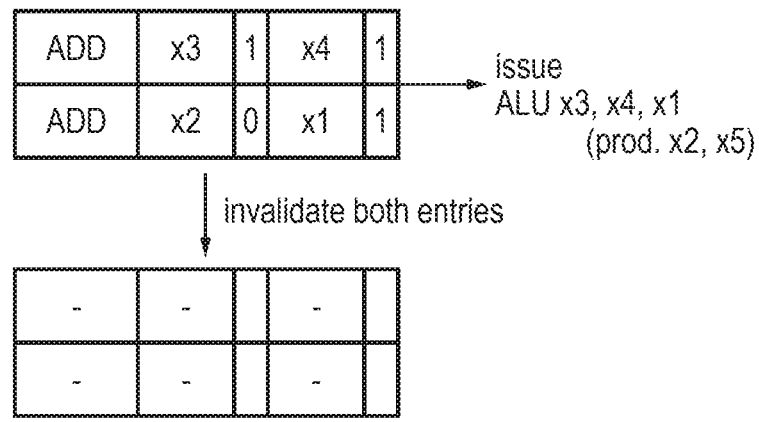

An example of this is shown in FIGS. 5A to 5C. FIG. 5A shows an example of two add instructions, ADD x2, x3, x4 which controls the pipeline 2 to add the values in registers x3, x4 and place the result in register x2, and ADD x5, x2, x1 which triggers addition of the values in registers x2, x1 with the result being written to register x5. Hence, the second add instruction is dependent on the result of the preceding add instruction. As shown in the left hand part of FIG. 5A, these add instructions could be executed as separate uops, one for each addition. However, the execute stage 10 may also support execution of a compound uop that gives the same result, placing the sum of x3+x4 in register x2 and also placing the sum of x3+x4+x1 in register x5. Again, the decision of whether to execute several uops or fewer uops including a compound uop could be made at the issue stage 8, depending on the availability of the operands.

For example as shown in FIG. 5B, if the operands x3, x4 required for the first add are available, but the operand x1 for the second add is not yet available, then the first uop is issued and the second uop remains valid in the issue queue and waits for its operands x2, x1 to become available (operand x2 will be generated as a result of the first uop).

Alternatively, as shown in FIG. 5C, if by the time the operands x3, x4 for the first add become available, the additional operand x1 for the second add is also available, then a compound add uop can be issued and both issue queue 22 entries can be invalidated. Note that it is not necessary for the x2 operand of the second add to become available because this will be the result of the first add and so will be generated during the compound add operation.

Hence, by providing the hybrid approach shown in FIGS. 5B and 5C, and deferring the decision as to whether to execute the two add instructions as a single uop or multiple uops until the issue stage, depending on resource availability, issue bandwidth can be saved when possible (as in FIG. 5C), but if the resources required for doing this are not yet available, the instruction can be executed as split uops so that any subsequent instruction using register x2 is not stalled unnecessarily.

The examples discussed above show how to determine the number of uops to be executed depending on operand availability. However, it is also possible to determine the number of uops based on availability of other types of processing resource. For example, the number of uops may be determined based on the availability of at least one hardware resource. Even if all the required operands are available, if the compound execute unit 14-1 which could execute the combined uop is not currently available because it is executing another uop, then it may be more efficient to issue split uops to other execute units 14 so that at least some of these can proceed and other dependent uops are not stalled. Hence, the decision as to whether to split a single uop into multiple uops or issue a compound uop could be dependent on a range of different resource types, including the operand availability and/or availability of a hardware resource such a bandwidth on a given hardware unit.

Figure 6:
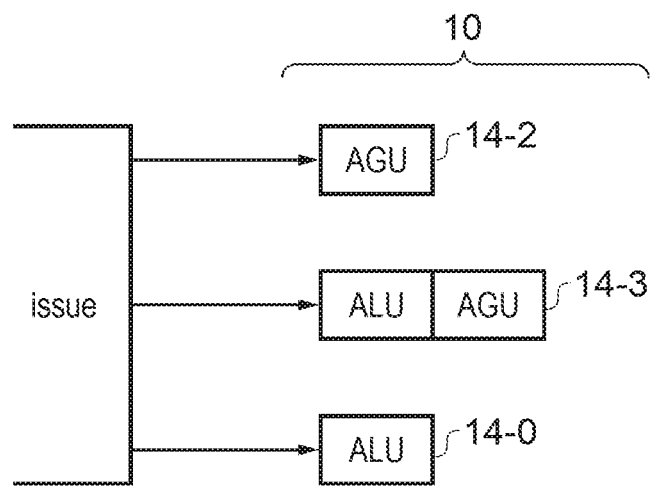
FIG. 6 shows an example of execute circuitry including an execute unit supporting execution of compound micro-operations.
Figure 7:
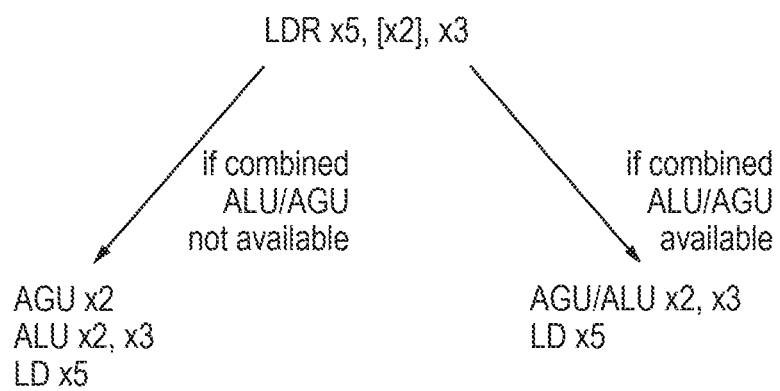
FIG. 7 shows an example of determining how many micro-operations to execute for a given instruction based on availability of a hardware resource.

For example, FIG. 6 shows another example of the execute stage 10 comprising a number of execute units including an ALU 14-0, an AGU 14-2 and a combined ALU/AGU 14-3. As shown in FIG. 7, a load instruction LDR x5, [x2], x3 using post-indexed addressing may require a step of calculating an address using base register x2, a step of updating the address in base register x2 using an offset stored in register x3, and a step of loading a value from the calculated address into register x5. The load operation may be carried out using a load store unit not shown in FIG. 6, and may be executed in the same way regardless of which approach is taken for the other operations. However, as shown in FIG. 7, the address calculation and base register update operations may be performed either using separate uops executed by the AGU 14-2 and ALU 14-0 respectively as in the left hand part of FIG. 7, or using a compound UOP executed by the combined ALU/AGU 14-3 as in the right hand part of FIG. 7.

If, when the operands become available, the combined ALU/AGU 14-3 is not available, then the split uop approach in the left hand part of FIG. 7 can be selected to allow the AGU and ALU operations to make progress and any subsequent dependent uops to proceed as well. If the combined ALU/AGU 14-3 is available, then the compound uop can be issued as in the right hand part of FIG. 7, to reduce the required issue bandwidth and free the AGU 14-2 and ALU 14-0 for use by other uops.

Some specific examples of instructions to which the present technique may be applied have been described above. However, the same principle could be applied to other types of instructions for which dynamic conditions determine which compositions of uops is most favourable.

Some pipelines may support multiple points at which instructions are split into smaller operations. For example, in some cases there may be a first pass split into macro-operations at the decode stage 6, and then a second split into micro-operations at a dispatch or issue stage. In this case, the dynamic determination of the number of uops based on resource availability could take place at only one of the multiple splitting points, or at several of the splitting points. For example, the splitting at decode could be static, but the splitting at the issue stage could be dynamic depending on resource availability as discussed above.

Figure 8:
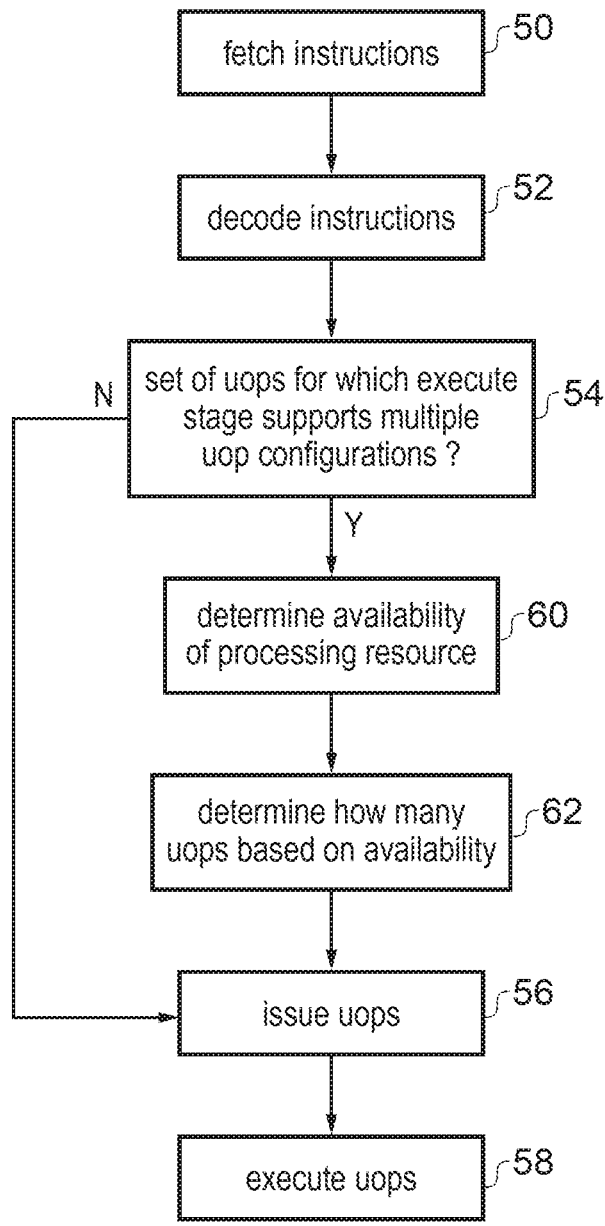
FIG. 8 shows a method of processing instructions.

FIG. 8 shows an example of a method of processing instructions using the pipeline. At step 50 instructions are fetched from the cache 12 by the fetch stage 4. At step 52 the fetched instructions are decoded to generate uops which are passed to the issue stage 8 and queued in the issue queue 20. At step 54, control circuitry associated with the issue stage 8 determines whether it has received a set of uops for which the execute stage 10 would support execution of those operations using two or more different configurations of uops (e.g. the set of uops could be executed using split uops or using at least one compound uop). If the set of uops received does not have multiple options available for splitting these into uops to be executed, then at step 56 the uops are simply issued for execution in their original form, and are executed at step 58 by the execute stage 10.

However, if at step 54 it is determined that multiple uop configurations are available for the received set of uops, then at step 60 the control circuitry of the issue stage 8 determines whether at least one processing resource is available. For example, the at least one processing resource could be a resource required for executing a compound uop (whether a particular set of one or more operands, or a hardware unit of the pipeline), which would not be required for executing at least one uop in the split uop configuration. Based on the availability of the processing resource, at step 62 the control circuitry determines how many uops should be executed. For example, the control circuitry may determine that fewer uops should be executed when the at least one processing resource is available, and split the operations into a larger number of uops when the at least one processing resource is not available. At step 56, the determined number of uops are issued, and at step 58 the execute stage 10 executes any issued uops.

Figure 9:
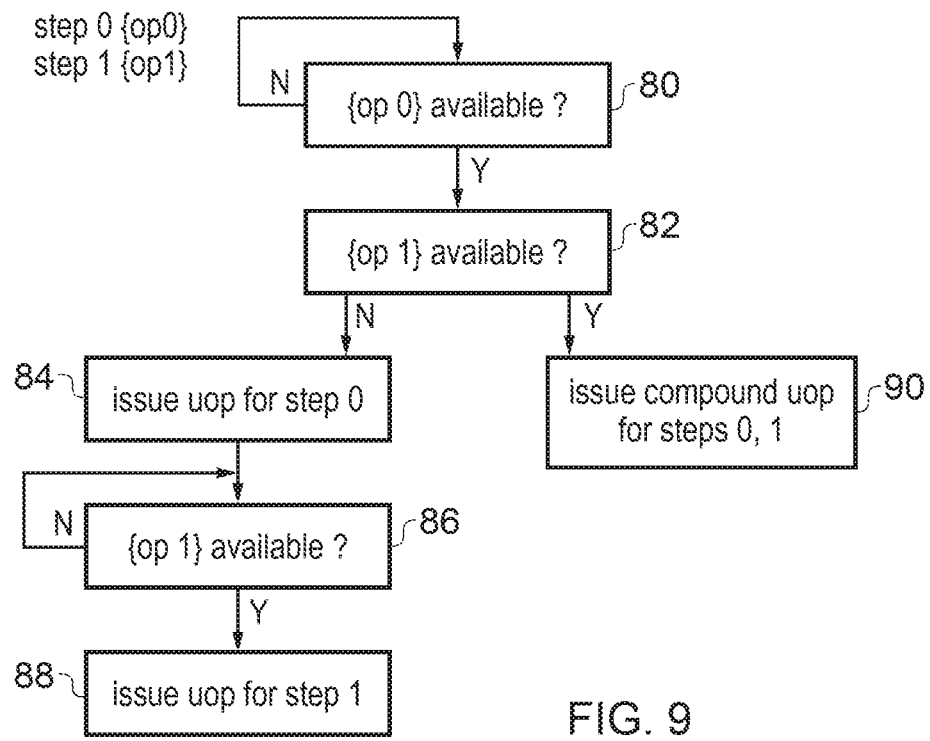
FIG. 9 shows a method of determining how many micro-operations to execute based on operand availability.

FIG. 9 shows an example of determining how many uops are to be issued based on operand availability. This could be one of the considerations at step 62 of FIG. 8. As shown at the top of FIG. 9, there may be a certain number of processing steps including step 0 to be performed using a first set of operands {op0} and step 1 to be performed using a second set of operands {op1}. The first and second sets of operands {op0}, {op1} each comprise one or more operands, and sometimes could overlap to some extent so that some of the operands required for step 1 may also be required for step 0 or vice versa. At step 80 of FIG. 9, the issue stage 8 determines whether the first set of operands {op0} is available. If not, then the issue stage 8 waits for the first set of operands {op0} to be available. When the first set of operands {op0} is available, then at step 82 the issue stage 8 determines whether the second set of operands {op1} is also available. If not, then at step 84 the issue stage 8 issues a single uop for implementing step 0 to the execute stage 10, leaving another uop pending in the issue queue 10 for step 1. At step 86 the issue stage then waits for the second set of operands {op1} to become available, and when the second set of operands is available, at step 88 the issue stage 8 issues another uop for controlling the execute stage 10 to perform step 1. On the other hand, if at step 82 the second set of operands {op1} was available at the time when the first set of operands {op0} became available, then at step 90 a compound uop is issued for controlling the execute stage 10 to perform both steps 0 and 1. In this way, uops can be combined to save hardware bandwidth when all the required operands are available, but if only some of the operands are available, the initial step 0 is not delayed while waiting for the operands required for step 1 to become available, and similarly any subsequent operations which depend on step 0 are also not delayed. This provides a better balance between performance and hardware efficiency.

Figure 10:
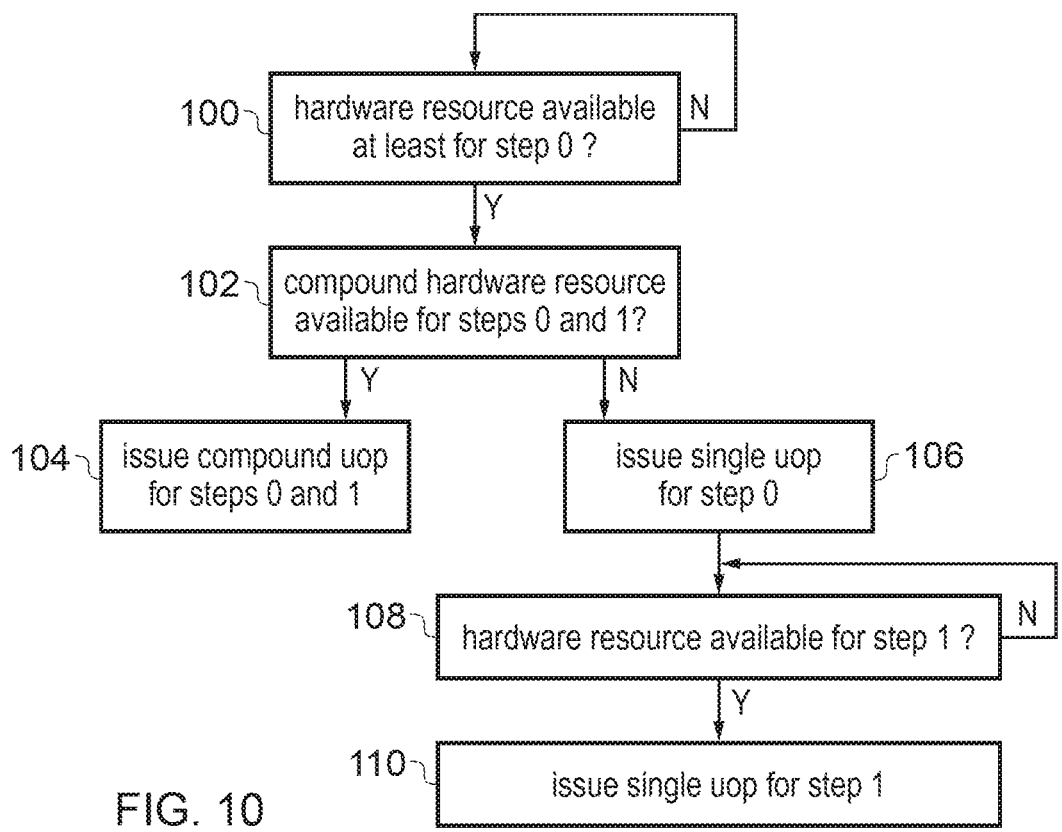
FIG. 10 shows a method of determining how many micro-operations to execute based on availability of a hardware resource.

FIG. 10 shows another example of a method of determining how many uops are to be executed based on hardware resource availability, which again may be part of step 62 of FIG. 8. The hardware resource to be considered could be any kind of resource required for executing a compound uop, such as bandwidth on a particular execute unit, bus, issue port, register read port, external device, or any other hardware device. Again, FIG. 10 assumes that two steps 0 and 1 are to be performed. At step 100, the issue stage 8 waits for a given hardware resource required for step 0 is available. When this resource is available and so at least step 0 can be executed, the issue stage 8 determines whether the compound hardware resource for executing a compound uop corresponding to steps 0 and 1 is available. For example the compound hardware resource could be the combined execute unit 14-1 or 14-3 as shown in FIG. 1 or 6. If the compound hardware resource is available then at step 104 the compound uop for both steps 0 and 1 is issued, to reduce the number of cycles in which bandwidth is taken up on the issue port 16 or execute units 14 for processing uops corresponding to steps 0 and 1, and reducing residency times in the issue queue 20 for these operations. However if the compound hardware resource is not available then at step 106 a single uop corresponding to step 0 is issued, so that this can proceed and any other dependent operations can proceed after this uop. At step 108 the issue stage continues to monitor whether there is hardware resource available for carrying out step 1, and when this becomes available then at step 110 a second uop is issued corresponding to step 1.

While FIGS. 9 and 10 show separate methods for checking operand and hardware resource availability, other approaches may consider both these conditions so that the compound uop may be issued when there is compound hardware resource available and the required operands for both steps are available. If either the compound hardware resource is not available, or the operands required for the second step are not available yet, then a single uop can be issued for the first step, with a second uop issued subsequently once the operands become available or a hardware resource for processing the second uop becomes available.

FIGS. 9 and 10 show examples where two processing steps 0 and 1 are combined into a single uop or split into two uops depending on resource availability. However, a similar approach could be taken for a series of three or more processing steps which could be implemented using different numbers of uops depending on resource availability.

Some specific examples have been discussed above, but more generally the technique may be applied to any system having execute circuitry to execute micro-operations and control circuitry which determines, in dependence on availability of at least one processing resource, how many micro-operations are to be executed in response to a given set of one or more instructions fetched from a data store such as an instruction cache or memory.

For example, the given set of instructions may be any set of one or more instructions for which the execute circuitry may support both a compound micro-operation corresponding to at least two processing steps to be performed in response to the given set of instructions, as well as supporting individual micro-operations each corresponding to one of the at least two steps.

In the above examples, the issue stage acts as the control circuitry for determining how many uops are to be executed depending on availability of a processing resource. In these examples, the issue stage considers the actual availability of the processing resource at the time the uops are to be issued, in order to determine whether it is most efficient to issue more or fewer uops. As mentioned above, the issue stage could either combine multiple uops from the issue queue to generate a combined uop to be issued for execution, or split a single uop from the issue queue into multiple uops to be issued separately. Where multiple uops are combined, these could have been decoded from a single instruction (as in the example of FIG. 4) or from different instructions (as in the example of FIG. 5).

However, other examples could consider an expected availability of processing resource at some future point of the pipeline. For example a prediction of whether a resource such as an operand or a hardware unit is likely to be available in future could be made. For example, the prediction could be based on past execution of the same instructions, or based on monitoring of other recently encountered instructions which may block use of certain hardware resources for example. Hence, it can be predicted whether, by the time a given set of uops reach the issue stage, it is likely that a certain processing resource will be available, and then a given pattern of uops can be generated which is expected to be most efficient given the prediction. For example, if the operands or a hardware unit required for a second stage of a processing operation are not predicted to be available by the time the uops reach issue, then split uops could be generated, but if the resource is predicted to be available then a compound uop could be generated. If the prediction turns out to be incorrect, then executing the less preferred set of resources may have a small performance penalty (there is no need to flush the pipeline or rewind state in the case of a misprediction, since the prediction only affects the performance level achieved but does not affect the correctness of the processing result). Nevertheless, when the prediction success rate is high enough, then the average performance achieved will be higher than in systems which simply issue a static set of uops on every instance of a given instruction.

Hence, it is not necessary to wait until the issue stage before determining dynamically how to split a given instruction into uops. In other examples the control circuitry for determining how many uops are to be executed could be at a different stage of the pipeline. For example the decode stage 6 may act as the control circuitry. Rather than decoding instructions into a fixed set of uops as in previous systems, the decode stage 6 could make a prediction as to whether at least one processing resource is expected to be available later in the pipeline, and determine how many uops to generate based on the prediction.

The present technique may be used in an in-order processor which processes uops in an order corresponding to the program order of the original instructions fetched from the data store 12. Even in an in-order processor, there can be some performance benefit to reducing the number of uops to be executed if possible given resource availability, but allowing an earlier uop to proceed if resources required for a later uop are not ready yet.

However, this technique is particularly useful for processing circuitry which supports out of order execution. In an out-of-order processor, even if the second uop of a split set of uops is stalled, subsequent operations which require the result of the first uop can still be executed, making it more attractive to split operations into multiple uops to reduce dependencies. Nevertheless, if all the resources required are available, then selecting to execute a smaller number of uops instead can reduce hardware resource bandwidth required for those uops and so free bandwidth for other uops which could be executed out of turn to make use of the spare bandwidth.

The processing circuitry discussed above can be included in any kind of electronic apparatus such as a computer, mobile telephone, tablet television, control system for an automobile or other vehicle, appliance or other device, or any other electronic apparatus.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes and modifications can be effected therein by one skilled in the art without departing from the scope of the appended claims.

I claim:

1. Processing circuitry comprising:
   execute circuitry to execute micro-operations in response to instructions fetched from a data store; and
   control circuitry to determine, in dependence on availability of at least one processing resource, how many micro-operations are to be executed by the execute circuitry in response to a given set of one or more instructions fetched from the data store,
   wherein said at least one processing resource comprises at least one operand required for processing of said given set of one or more instructions,
   wherein the control circuitry comprises issue circuitry to issue micro-operations for execution by the execute circuitry, and the issue circuitry comprises an issue queue to queue micro-operations awaiting issue, and
   wherein the issue circuitry is configured to determine in dependence on said availability of said at least one operand required for processing of said given set of one or more instructions, whether to split a single micro-operation queued in the issue queue into multiple micro-operations to be issued separately to the execute circuitry.

2. The processing circuitry according to claim 1, wherein the given set of one or more instructions is for triggering the execute circuitry to execute a plurality of processing steps; and
   the control circuitry is configured to determine, in dependence on said availability of said at least one processing resource, whether to control the execute circuitry to execute a compound micro-operation corresponding to at least two of said plurality of processing steps, or individual micro-operations each corresponding to one of said at least two of said plurality of processing steps.

3. The processing circuitry according to claim 1, wherein the given set of one or more instructions is for triggering the execute circuitry to perform at least a first processing step requiring a first operand set comprising one or more operands and a second processing step requiring a second operand set comprising one or more operands.

4. The processing circuitry according to claim 3, wherein said control circuitry is configured to determine how many micro-operations are to be executed in dependence on availability of the second operand set at the time a first operand set becomes available.

5. The processing circuitry according to claim 3, wherein in response to determining that the second operand set would be available at a time the first operand set becomes available, the control circuitry is configured to control the execute circuitry to execute a compound micro-operation corresponding to both the first and second processing steps.

6. The processing circuitry according to claim 3, wherein in response to determining that the second operand set would be unavailable at the time a first operand set becomes available, the control circuitry is configured to control the execute circuitry to execute individual micro-operations corresponding to the first and second processing steps.

7. The processing circuitry according to claim 1, wherein said at least one processing resource comprises at least one hardware resource of said processing circuitry.

8. The processing circuitry according to claim 1, wherein the given set of one or more instructions is for triggering the execute circuitry to perform at least a first processing step and a second processing step; and
   said at least one processing resource comprises a selected hardware resource supporting execution of a compound micro-operation corresponding to both the first and second processing steps.

9. The processing circuitry according to claim 8, wherein in response to determining availability of said selected hardware resource, the control circuitry is configured to control the execute circuitry to execute the compound micro-operation; and
   in response to determining unavailability of said selected hardware resource, the control circuitry is configured to control the execute circuitry to execute individual micro-operations corresponding to said first and second processing steps.

10. The processing circuitry according to claim 1, wherein said availability comprises a current availability of said at least one processing resource.

11. The processing circuitry according to claim 1, wherein said availability comprises an expected future availability of said at least one processing resource.

12. The processing circuitry according to claim 1, wherein the control circuitry comprises decode circuitry to decode the instructions fetched from the data store to generate micro-operations to be executed by the execute circuitry.

13. The processing circuitry according to claim 1, wherein on issuing a first of said multiple micro-operations to the execute circuitry, the issue circuitry is configured to update an entry of the issue queue corresponding to said single micro-operation to indicate another of said multiple micro-operations.

14. The processing circuitry according to claim 1, wherein the issue circuitry is configured to determine, in dependence on said availability of said at least one processing resource, whether to merge a plurality of micro-operations queued in the issue queue to form a compound micro-operation to be issued to the execute circuitry.

15. The processing circuitry according to claim 1, wherein the processing circuitry supports out-of-order execution.

16. An electronic apparatus comprising the processing circuitry according to claim 1.

17. A method comprising:
  fetching a set of one or more instructions from a data store;
  in dependence on availability of at least one processing resource, determining how many micro-operations are to be executed in response to said set of one or more instructions; and
  executing the micro-operations using execute circuitry,
  wherein said at least one processing resource comprises at least one operand required for processing of said given set of one or more instructions, the method further comprising:
  issuing, by issue circuitry, micro-operations for execution by the execute circuitry;
  queuing micro-operations awaiting issue in an issue queue, and
  in dependence on said availability of said at least one operand required for processing of said given set of one or more instructions, determining, by the issue circuitry, whether to split a single micro-operation queued in the issue queue into multiple micro-operations to be issued separately to the execute circuitry.

* * * * *